US012737956B2

(12) United States Patent
Yi et al.

(10) Patent No.: US 12,737,956 B2
(45) Date of Patent: Sep. 15, 2026

(54) SCENE-AWARE SYNTHETIC HUMAN MOTION GENERATION USING NEURAL NETWORKS

(71) Applicant: NVIDIA Corporation, Santa Clara, CA (US)

(72) Inventors: Hongwei Yi, Tubingen (DE); Davis Rempe, Redwood City, CA (US); Xue Bin Peng, Vancouver (CA); Sanja Fidler, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 50 days.

(21) Appl. No.: 18/415,496

(22) Filed: Jan. 17, 2024

(65) Prior Publication Data

US 2025/0232506 A1 Jul. 17, 2025

(51) Int. Cl.
*G06T 13/40* (2011.01)

(52) U.S. Cl.
CPC .......... *G06T 13/40* (2013.01); *G06T 2210/56* (2013.01)

(58) Field of Classification Search
None
See application file for complete search history.

(56) References Cited

U.S. PATENT DOCUMENTS

2024/0257470 A1* 8/2024 Gupta .................... G06T 19/00
2024/0424398 A1* 12/2024 Kumar .................... A63F 13/67
2025/0124634 A1* 4/2025 Beeler ....................... G06T 5/70
2025/0173959 A1* 5/2025 Lee ......................... G06T 17/00
2025/0232506 A1* 7/2025 Yi ........................... G06T 13/40

OTHER PUBLICATIONS

Li, Jiaman, Jiajun Wu, and C. Karen Liu. "Object motion guided human motion synthesis." ACM Transactions on Graphics (TOG) 42.6 (2023): 1-11. (Year: 2023).*
Karunratanakul, Korrawe, et al. "Guided motion diffusion for controllable human motion synthesis." Proceedings of the IEEE/CVF International Conference on Computer Vision. 2023. (Year: 2023).*

(Continued)

*Primary Examiner* — Ryan M Gray
(74) *Attorney, Agent, or Firm* — Freestone Intellectual Property Law PLLC

(57) ABSTRACT

A motion diffusion model may be pre-trained on motion data, and a scene-aware component (e.g., one or more layers of a neural network) may be connected and used to extract and inject a representation of scene information into the pre-trained motion diffusion model. For example, to predict orientations of joint waypoints along a path through a particular 3D scene, a scene-aware input channel that accepts a representation of the 3D structure of the scene may be added to a pre-trained motion diffusion model. To predict orientations of joint waypoints along a path that interacts with a 3D object in the 3D scene, a scene-aware input channel that accepts a representation of the 3D object and/or a surface thereof may be added to a pre-trained motion diffusion model. As such, the resulting scene-aware motion diffusion model(s) may be tuned on motion-scene data and used to generate human motion.

20 Claims, 7 Drawing Sheets

(56) References Cited

OTHER PUBLICATIONS https://repository.lib.cuhk.edu.hk/en/item/cuhk-3357975 (Year: 2023).*
Hassan, M., et al., "Stochastic Scene-Aware Motion Prediction", IEEE International Conference on Computer Vision, ICCV 2021, pp. 11374-11384 (2021).
Starke, S., et al., "Neural State Machine for Character-Scene Interactions", ACM Transactions on Graphics, vol. 38, No. 6, pp. 14 (Nov. 2019).
Wang, J., et al., "Synthesizing Long-Term 3D Human Motion and Interaction in 3D Scenes", 2021 IEEE/CVF Conference on Computer Vision and Pattern Recognition (CVPR), vol. 38, pp. 9401-9411 (2021).
Wang, J., et al., "Towards Diverse and Natural Scene-aware 3D Human Motion Synthesis", Computer Vision and Pattern Recognition, pp. 20460-20469 (2022).
Huang, S., et al., "Diffusion-based Generation, Optimization, and Planning in 3D Scenes", 2023 IEEE/CVF Conference on Computer Vision and Pattern Recognition (CVPR), pp. 16750-16761 (2023).
Wang, Z., et al., "HUMANISE: Language-conditioned Human Motion Generation in 3D Scenes", 36th Conference on Neural Information Processing Systems (NeurIPS 2022), pp. 1-13 (2022).
Zhao, K., et al., "Synthesizing Diverse Human Motions in 3D Indoor Scenes", ICCV, arXiv:2305.12411v3, pp. 1-16 (Aug. 21, 2023).
Shafir, Y., et al., "Human Motion Diffusion as a Generative Prior", arXiv.2303.01418v3, 10 pages (Aug. 30, 2023).
Karunratanakul, K., et al., "Guided Motion Diffusion for Controllable Human Motion Synthesis", arXiv.2305.12577v3, pp. 1-16 (Oct. 29, 2023).
Hu, E., et al., "LoRA: Low-Rank Adaptation of Large Language Models", arXiv:2106.09685v2, pp. 1-26 (Oct. 16, 2021).
Zhang, L., et al., "Adding Conditional Control to Text-to-Image Diffusion Models", arXiv:2302.05543v3, 12 pages (Nov. 26, 2023).
Zhang, S., et al., "PLACE: Proximity Learning of Articulation and Contact in 3D Environments", arXiv: 2008.05570v4, pp. 1-16 (Nov. 12, 2020).
Tevet, G., et al., "Human Motion Diffusion Model", arXiv:2209.14916v2, pp. 1-12 (Oct. 3, 2022).
Prokudin, S., et al., "Efficient Learning on Point Clouds with Basis Point Sets", arXiv:1908.09186v1, 12 pages (Aug. 24, 2019).

* cited by examiner

GENERATE, BASED AT LEAST ON PROCESSING A REPRESENTATION OF AT LEAST A PORTION OF A THREE-DIMENSIONAL (3D) SCENE USING A DIFFUSION MODEL COMPRISING A SCENE-AWARE COMPONENT AND A PRE-TRAINED DIFFUSION MODEL, A REPRESENTATION OF SCENE-AWARE MOTION COMPRISING ONE OR MORE ORIENTATIONS OF ONE OR MORE JOINT WAYPOINTS ALONG ONE OR MORE PATHS OF A CHARACTER IN THE 3D SCENE
B402

SCENE-AWARE SYNTHETIC HUMAN MOTION GENERATION USING NEURAL NETWORKS

BACKGROUND

Human character motion (or simply human motion) generation typically seeks to create realistic and natural movements for virtual or animated characters that mimic the way humans move in the real world. For example, human motion generation may attempt to simulate the complex interplay of joints, muscles, and/or physical constraints to produce lifelike animations. Human motion generation often plays a central role in computer graphics, animation, and/or virtual reality applications, as it can add a layer of authenticity and immersion to digital experiences in various industries and applications, such as video games, film and television production, simulation training, healthcare (e.g., for physical therapy simulations), and/or other scenarios. For example, in the entertainment industry, human motion generation can enable the creation of compelling and believable characters, enhancing the overall viewing experience. In the context of training or design simulations, human motion generation can allow professionals to practice or design in a controlled environment without real-world risks. In healthcare, human motion generation can aid in rehabilitation and recovery by providing patients with interactive exercises tailored to their specific needs. These are just a few examples in which human motion generation can help bridge the gap between the digital and physical worlds.

Conventional synthetic human motion generation techniques have a variety of drawbacks. For example, some techniques may seek to generate human motion (e.g., a character animation) within a particular three-dimensional (3D) scene based on an input text prompt providing some type of instruction (e.g. “sit on the couch”). Typically, the goal is to generate motion that is physically realistic both in terms of navigating the 3D scene (e.g., avoiding collisions while navigating around furniture) and interacting with objects in the scene (e.g., humans usually sit facing forward on a chair rather than sideways). However, conventional techniques struggle to generate realistic motion for many 3D scenes. For example, conventional human motion generation techniques typically require high-quality training data that pairs captured human motion with corresponding 3D scenes and interactions within the 3D scene. This type of dataset can be very challenging and costly to generate (e.g., requiring high-quality motion capture with the particular characters, actions, objects, and/or 3D scenes of interest). As a result, this type of training data is usually limited, so conventional models trained on certain characters, actions, objects, and/or 3D scenes will typically not generalize to others, resulting in unrealistic and/or low-quality motion animation. Some techniques attempt to address this concern by placing high-quality motion capture sequences (that were captured without the environment) into scanned scene environments. However, the resulting synthetic motion from these techniques often does not reflect reasonable human behavior in the real world. Finally, one conventional technique attempts to address the lack of suitable training data using reinforcement learning, which does not require any paired motion-scene data, but instead trains a different policy for each type of supported interaction. However, limiting generated motion to specifically contemplated human interactions is unlikely to capture the full range and subtleties of potential human motion. As such, there is a need for improved human motion generation techniques.

SUMMARY

Embodiments of the present disclosure relate to scene-aware human motion generation. Systems and methods are disclosed that pre-train a base motion diffusion model without scene information, connect a scene-aware component, and tune the resulting motion diffusion model on data with scene information.

In contrast to conventional systems, such as those described above, a motion diffusion model may be pre-trained on motion data, and a scene-aware component (e.g., one or more layers of a neural network) may be connected and used to extract and inject a representation of scene information into the pre-trained motion diffusion model. For example, to predict orientations of joint waypoints along a path through a particular 3D scene, a scene-aware input channel that accepts a representation of the 3D structure of the scene may be added to a pre-trained motion diffusion model. To predict orientations of joint waypoints along a path that interacts with a 3D object in the 3D scene, a scene-aware input channel that accepts a representation of the 3D object and/or a surface thereof may be added to a pre-trained motion diffusion model. As such, the resulting scene-aware motion diffusion model(s) may be tuned on motion-scene data and used to generate human motion. Accordingly, the techniques described herein may be utilized to generate scene-aware human motion for a character based on a representation of a 3D scene and/or a target 3D object for the character to interact with. By incorporating a scene-aware component with a base pre-trained motion diffusion model, the resulting scene-aware motion diffusion model may be fine-tuned on limited set of motion-scene data, enabling generation of more accurate and scene-aware human motion on far less motion-scene data than in prior techniques.

BRIEF DESCRIPTION OF THE DRAWINGS

The present systems and methods for scene-aware human motion generation are described in detail below with reference to the attached drawing figures, wherein.

DETAILED DESCRIPTION

Figure 1:
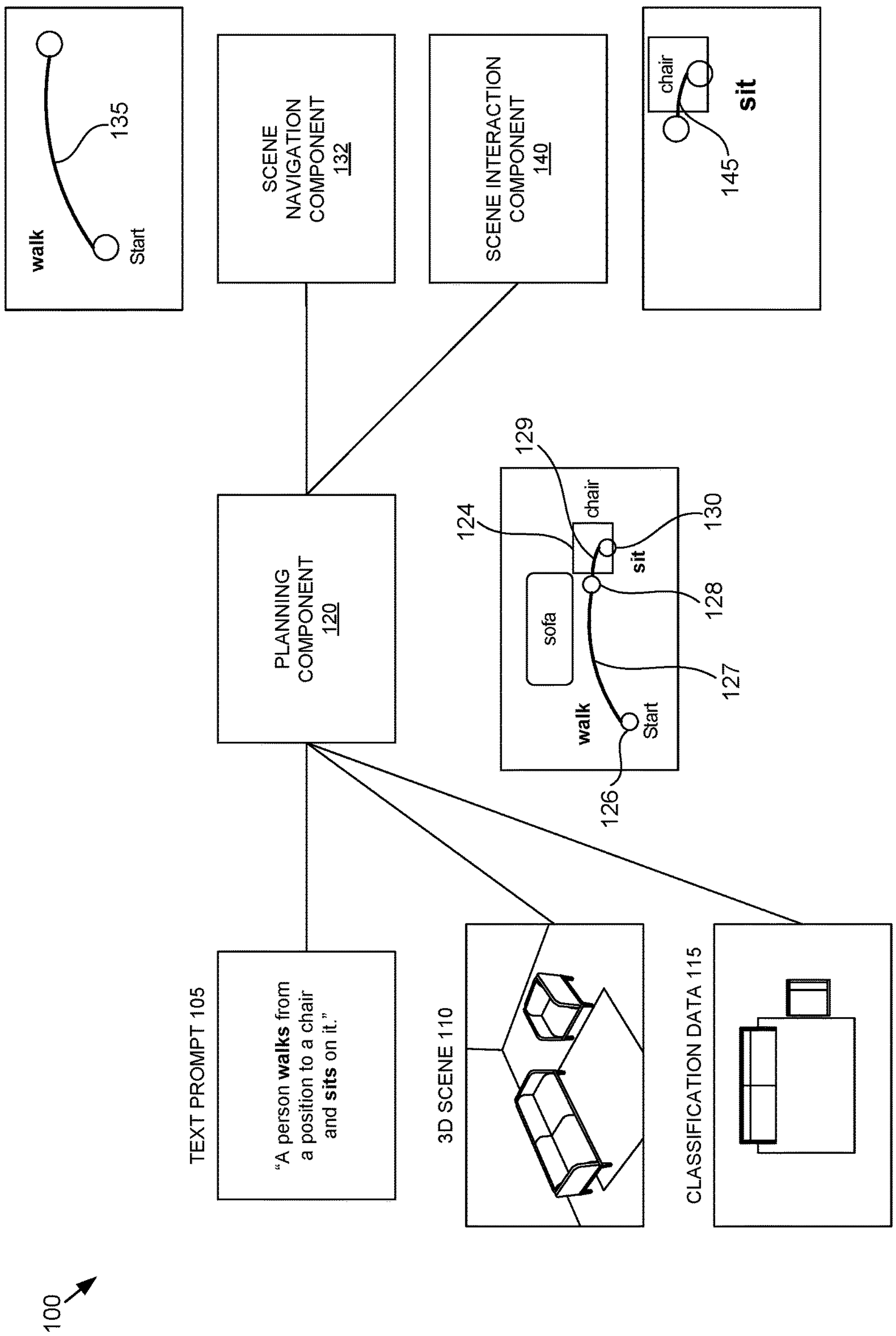
FIG. 1 is a block diagram of an example motion generation pipeline, in accordance with some embodiments of the present disclosure.

Systems and methods are disclosed related to scene-aware human motion generation. In some embodiments, a diffusion model (e.g., a motion diffusion model) may be pre-trained on motion data and used as a base model, and a scene-aware component (e.g., one or more layers of a neural network) may be used to extract and inject a representation of scene information into the pre-trained motion diffusion model. For example, to predict orientations of joint (e.g., root joint) waypoints along a path through a particular 3D scene, a scene-aware input channel that accepts a representation of the 3D structure of the scene (e.g., a two-dimensional (2D) or 3D occupancy grid, floor map, height map, semantic segmentation, etc.) may be added to a pre-trained motion diffusion model. In another example, to predict orientations of joint (e.g., root joint) waypoints along a path that interacts with a 3D object in the 3D scene, a scene-aware input channel that accepts a representation of the 3D object and/or a surface thereof (e.g., a 3D point cloud) may be added to a pre-trained (e.g., motion) diffusion model. As such, the resulting scene-aware motion diffusion model(s) may be tuned (e.g., fine-tuned) on motion-scene data and used to generate human motion. The present techniques may be used to generate more accurate and scene-aware human motion on far less motion-scene data than in prior techniques.

For example, given a representation of a 3D scene, a starting point, an instruction (e.g., a text prompt, such as an instruction for a character to "sit on the couch"), classification data such as a semantic segmentation of the 3D scene, and/or other input(s), any known path planning technique may be used to identify a target point in the 3D scene where the character should move to, identify a path to the target point through the 3D scene (e.g., to the chair) that avoids collisions (e.g., with other furniture), identify a path implementing an interaction with a target object in the 3D scene (e.g., sitting down on the chair), and/or identify one or more contact points between the character and the target object. Each path may take the form of a sequence of 2D or 3D waypoints (or the waypoints may be sampled along the path). In some embodiments, the sequence of waypoints may represent (or be used to generate corresponding) successive 2D or 3D positions of one or more joints (e.g., a root joint) of the character being animated. These waypoints may be used as inputs into one or more diffusion models to predict orientations of the corresponding joint(s) at the waypoints. Additionally or alternatively to identifying a path to the target point and/or a path implementing an interaction with a target object prior to predicting orientations of joint(s) at waypoints along the path(s), any known planning technique may be used to identify the target point and/or one or more contact points between the character and the target object, and noised intermediate waypoints may be used as inputs into one or more diffusion models to predict positions and orientations of the corresponding joint(s) at the waypoints, effectively predicting the path(s) and poses along the path(s) (e.g., given positions of a starting point, target point, and/or one or more contact points).

For example, to predict joint orientations (and/or positions) for a motion sequence represented by a sequence of waypoints along a path through a 2D or 3D scene, a scene-aware diffusion model may encode representations of an instruction (e.g., a text instruction), positions and noised orientations of the sequence of waypoints (and/or noised positions of waypoints if predicting corresponding waypoint positions), and a 2D or 3D structure of at least a portion of the 3D scene (e.g., a 2D or 3D occupancy grid, a floor map, a height map, a patch of one of the foregoing such as an ego-centric patch, classification data such as a semantic segmentation representing any number of classes of objects or other parts of the scene, etc.). In some embodiments, the classification data may include a layer for each of one or more classes of object, such as (e.g., different types of) furniture, doors, windows, appliances, walls, lighting fixtures, electrical outlets and switches, electronic devices, personal items, other character(s), audio sources, and/or other things in the scene. As such, the scene-aware diffusion model may combine these encoded inputs to predict a denoised scene-aware motion sequence.

For example, the scene-aware diffusion model may iteratively predict and refine a denoised motion sequence over a series of diffusion steps based on the 2D or 3D structure of the 3D scene. In each diffusion step, the scene-aware diffusion model (e.g., a transformer-based model) may predict a denoised motion sequence based on the 2D or 3D structure of the 3D scene and diffuse the predicted motion sequence back to the previous diffusion step, effectively updating the state of the denoised motion sequence based on scene structure in reverse order from the final diffusion step to the initial one. By beginning with the most refined representation of scene-aware motion and diffusing it back to the previous step, the denoised scene-aware motion sequence predicted in each diffusion step benefits from the accumulated improvements made in later steps, improves scene-aware temporal dependencies where a later state may be influenced by a previous state, and provides an opportunity to correct any errors or inaccuracies introduced in earlier steps, resulting in a more accurate and realistic scene-aware motion sequence.

In some embodiments, to predict joint orientations (and/or positions) for a motion sequence represented by a sequence of waypoints along a path that interacts with a target object in a 3D scene (e.g., sitting down on a chair), a scene-aware diffusion model may encode representations of an instruction (e.g., a text instruction), positions and noised orientations of the sequence of waypoints (and/or noised positions of waypoints if predicting corresponding waypoint positions), a 3D structure of the 3D object or a surface thereof (e.g., a 3D point cloud), one or more contact locations on the 3D object (e.g., the locations where the arms or pelvis contact the chair, whether previously determined during path planning using any known technique or noised contact locations to be predicted by the scene-aware motion diffusion model). As such, the scene-aware diffusion model may combine these encoded inputs to predict a denoised scene-aware motion sequence. In some embodiments, the scene-aware diffusion model may iteratively predict and refine a denoised motion sequence over a series of diffusion steps based on the 3D structure of the 3D object being interacted with. In each diffusion step, the scene-aware diffusion model (e.g., a transformer) may predict a denoised motion sequence based on the 3D structure of the 3D object and diffuse the predicted motion sequence back to the previous step, effectively updating the state of the scene-aware motion sequence based on the structure of the object in the scene in reverse order, effectively incorporating accumulated improvements, improving scene-aware (e.g., object-aware) temporal dependencies, and providing an opportunity to correct any errors or inaccuracies introduced in earlier steps, resulting in a more accurate and realistic scene-aware motion sequence.

In some embodiments, training data that pairs (e.g., captured) motion data with a corresponding 3D object being interacted with may be generated using data augmentation to retarget motion originally captured with respect to one object onto another object (e.g., retargeting captured motion data sitting down onto a particular chair onto different chair). In contrast to prior techniques that retarget contact locations (e.g., the locations where the arms or pelvis contact the chair) to target locations where corresponding joints of a skeletal structure make contact with the target object, in some embodiments, the surface structure of the body of the character may be modeled using a 3D model (e.g., a 3D mesh), so contact locations may be retargeted to target locations where corresponding locations on the body surface make contact with the target object. As such, the resulting retargeted motion-object interaction data is more accurate than prior techniques, and training a scene-aware diffusion model (e.g., fine-tuning a pre-trained diffusion model) using this training data increases the accuracy of the resulting generated motion.

In an example training embodiment, a pre-trained base diffusion model may be tuned or otherwise adapted to scene content using fine-tuning (e.g., freezing one or more layers of the pre-trained model), Parameter-Efficient Fine-Tuning (PEFT) (e.g., Low-Rank Adaptation (LoRA), prefix tuning, prompt tuning, p-tuning), some other technique that updates one or more trainable parameters (e.g., network weights, rank decomposition matrices, hard prompts, soft prompts), and/or otherwise. For example, tuning may involve adding one or more scene-aware layers that extract and inject a representation of scene information into the pre-trained base diffusion model and training the resulting model (e.g., fixing one or more pre-trained layers of the pre-trained base diffusion model) using (e.g., retargeted) motion-object data to learn corresponding weights for the added layer(s).

As such, the techniques described herein may be utilized to generate scene-aware human motion for a character based on a representation of a 3D scene and/or a target 3D object for the character to interact with. By incorporating a scene-aware component with a base pre-trained diffusion model, the resulting scene-aware diffusion model may be fine-tuned on more limited motion-scene data, enabling generation of more accurate and scene-aware human motion on far less motion-scene data than in prior techniques.

With reference to FIG. 1, FIG. 1 is an example motion generation pipeline 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In the example illustrated in FIG. 1, the motion generation pipeline 100 includes a planning component 120 that accepts a text prompt 105, a representation of a 3D scene 110, and classification data 115 representing one or more aspects of the 3D scene 110. In some embodiments, the planning component 120 uses one or more of these inputs to identify a target point in the 3D scene where a character in the 3D scene 110 should move to and/or position(s) of one or more waypoints along a path to the target point. As such, a scene navigation component 132 may use positions of a known starting point, the target point, and/or the waypoint(s) to predict orientations of corresponding joint(s) at the waypoints. In some embodiments, the planning component 120 predicts the path (e.g., positions of one or more waypoints), and the scene navigation component 132 predicts poses (e.g., orientations of the corresponding joint(s)) at the waypoints along the path. In some embodiments, the planning component 120 predicts the target point, and the scene navigation component 132 predicts the path (e.g., positions of one or more waypoints) and poses (e.g., orientations of the corresponding joint(s)) at the waypoints along the path.

In some embodiments, the text prompt 105 may represent an instruction for a character who is initially at a starting point 126 to interact with a target object in the 3D scene 110 (e.g., a chair 124). As such, the planning component 120 may identify the target object from the text prompt 105, identify a first target point 128 in the 3D scene 110 where the character may move prior to interacting with the target object, identify a corresponding interaction (e.g., sit on the chair 124), identify a second target point 130 where the character may move via the interaction, and/or identify one or more contact points between the character and the target object. Additionally or alternatively to the scene navigation component 132 predicting a path 127 between the starting point 126 and the first target point 128 and/or poses along the path 127 (e.g., motion sequence 135), a scene interaction component 140 may predict a path 129 between the first target point 128 and the second target point 130 and/or poses along the path 129 (e.g., motion sequence 145).

Generally, a variety of inputs are possible, depending on the implementation. For example, the motion generation pipeline 100 may be incorporated into, or triggered by, a user interface for a character animation, robotics, and/or other type of application that generates a representation of and/or animates motion, and the user interface may accept one or more user inputs representing an instruction for a character, robot, or other entity to move within and/or interact with the 3D scene 110. In the embodiment illustrated in FIG. 1, an instruction is embodied in natural language in the text prompt 105, but this need not be the case. Additionally or alternatively, the user interface may accept and/or encode an instruction represented in a voice command, a detected gesture, joystick or gamepad input, virtual or augmented reality controller(s), spatial coordinates identified via the user interface, and/or other type of input.

In embodiments that include the text prompt 105, the planning component 120 may use any known technique to evaluate the text prompt 105, a representation of a current state of the 3D scene 110 (e.g., a 2D or 3D occupancy grid, floor map, height map), and/or corresponding classification data 115 (e.g., a semantic segmentation of the 3D scene 110) to identify one or more target points for the character to move within the 3D scene 110 and/or a corresponding target orientation at each of the target point(s). For example, the planning component 120 may use natural language processing (e.g., named entity recognition, keyword extraction) to identify and extract relevant spatial information, a target object in the 3D scene 110, and/or directional cues referenced in the text prompt 105. Additionally or alternatively, the planning component 120 may use one or more machine learning models (e.g., one or more language models) to interpret the text prompt 105 and infer an intended target position and/or target orientation. In some embodiments, the planning component 120 may use any known technique to evaluate the text prompt 105, the 3D scene 110, and/or the classification data 115 to generate a path through the 3D scene 110 (e.g., the path 127) and/or a path implementing an interaction specified in the text prompt 105 (e.g., the path 129). For example, the planning component 120 may use a pathfinding algorithm (e.g., A*) to generate a path that avoids obstacles in the 3D scene 110. Note that FIG. 1 illustrates an embodiment in which the planning component 120 generates the paths 127 and 129, but this need not be the case.

Figure 2:
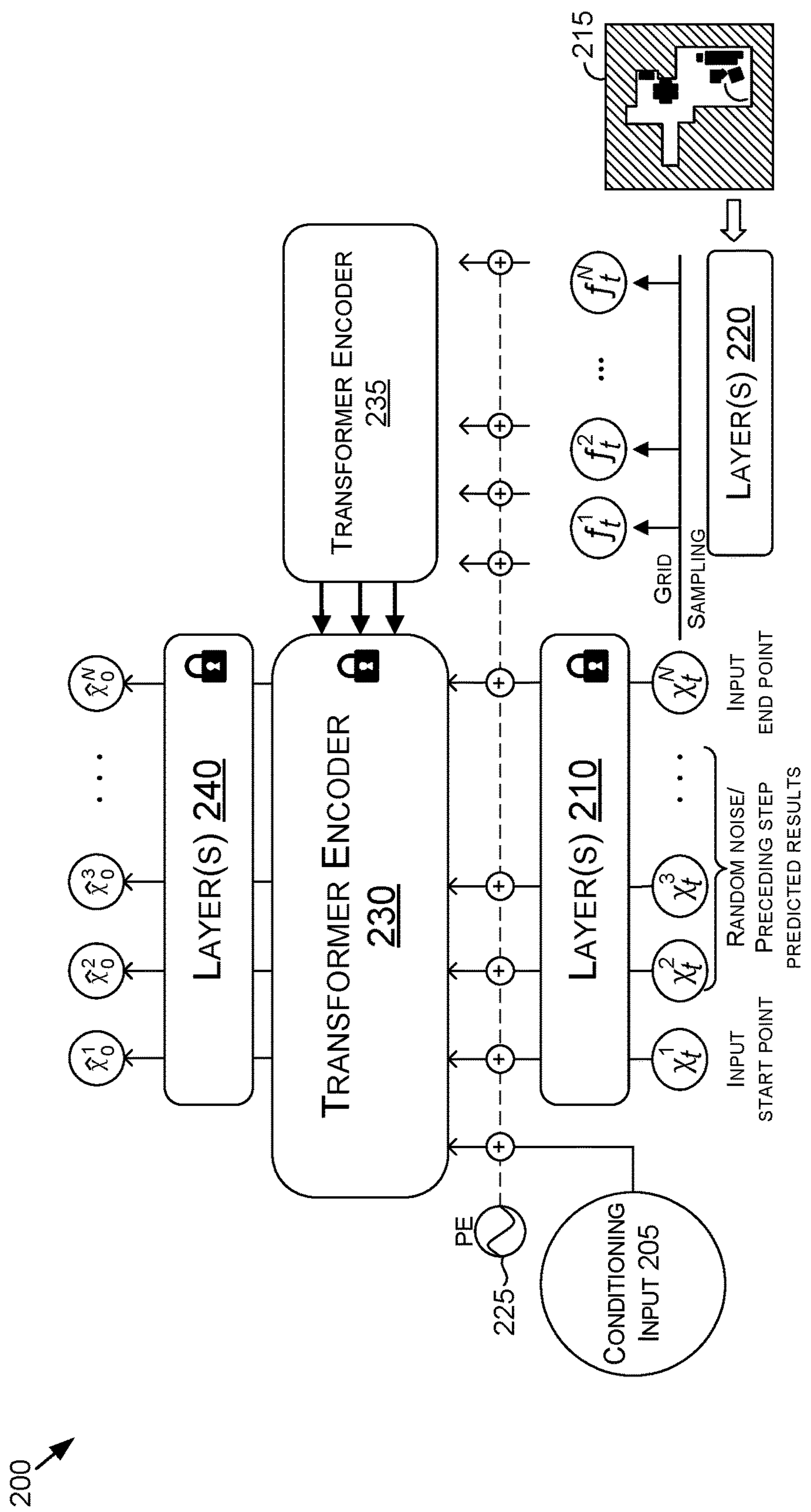
FIG. 2 is a block diagram of an example scene-aware motion diffusion model for a scene navigation component, in accordance with some embodiments of the present disclosure.

FIG. 2 is a block diagram of an example scene-aware diffusion model 200 for a scene navigation component, in accordance with some embodiments of the present disclosure. For example, the scene-aware diffusion model 200 may be used by the scene navigation component 132 of FIG. 1 to predict a motion sequence comprising joint orientations (and/or positions) of a sequence of waypoints along a path from the starting point 126 to the first target point 128 through the 3D scene 110.

In some embodiments, the scene-aware diffusion model 200 may be implemented using neural network(s). Although the scene-aware diffusion model 200 and other models and functionality described herein may be implemented using a neural network(s) (or a portion thereof), this is not intended to be limiting. Generally, the models and/or functionality described herein may be implemented using any type of a number of different networks or machine learning models, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, transformer, recurrent, perceptrons, Long/Short Term Memory (LSTM), Hopfield, Boltzmann, deep belief, de-convolutional, generative adversarial, liquid state machine, etc.), and/or other types of machine learning models.

Generally, a path may be represented as a sequence of 2D or 3D waypoints $x^1 \ldots x^N$, and the scene-aware diffusion model 200 may iteratively predict and refine a denoised motion sequence $\hat{x}^1 \ldots \hat{x}^N$ over a series of t diffusion steps. For example, the scene navigation component 132 may initially construct a representation of the sequence using one or more data structures that represent position (e.g., 3D positon, a 2D ground projection), orientation, and/or other features of one or more joints (e.g., a root joint such as the pelvis) of the character at each of the waypoints, populating known parameters (e.g., position and orientation of the starting point $x^1$ and target point $x^N$) in corresponding elements of the one or more data structures, and populating the remaining elements (e.g., the unknowns to be predicted) with random noise. As such, the scene navigation component 132 may generate and apply a representation of the motion sequence $$x_t^1 \ldots x_t^N$$

at a particular diffusion step t to the scene-aware motion diffusion model 200 to predict a denoised motion sequence $\hat{x}^1 \ldots \hat{x}^N$. FIG. 1 illustrates an embodiment in which the scene navigation component 132 starts at the last diffusion step t=T, using the scene-aware diffusion model 200 to predict a denoised motion sequence $$\hat{x}_0^1 \ldots \hat{x}_0^N$$

at the first diffusion step t=0. After this first iteration, the scene navigation component 132 may diffuse the denoised motion sequence to a state corresponding to the one preceding the last diffusion step t=T−1 (illustrated in FIG. 2 as the preceding step predicted results), and use that as an input into the scene-aware motion diffusion model 200 to again predict a denoised motion sequence $$\hat{x}_0^1 \ldots \hat{x}_0^N$$

at the first diffusion step t=0. The scene navigation component 132 may repeat this process, effectively updating the state of the denoised motion sequence in reverse order from the final diffusion step to the initial one. This reverse diffusion process is meant as an example, and other diffusion techniques with any number and order of diffusion steps may be implemented within the scope of the present disclosure.

In some embodiments, the scene-aware diffusion model 200 may include a base diffusion model (e.g., comprising layer(s) 210, a transformer encoder 230, and layer(s) 240) which may be pre-trained on motion data (e.g., input and output motion sequences) without scene data using any known technique. In the embodiment illustrated in FIG. 2, the scene-aware diffusion model 200 also includes a scene-aware component comprising layer(s) 220 and a transformer encoder 235, which may be integrated with or connected to the pre-trained base diffusion model, forming an input channel for scene data 215.

In some embodiments, the scene navigation component 132 may generate the scene data 215, which may represent one or more features of the 3D scene 110 and may take any suitable form. For example, the scene data 215 may represent a 2D or 3D structure of at least a portion of the 3D scene 110 (e.g., a 2D or 3D occupancy grid, a floor map, a height map, a patch of one of the foregoing such as an ego-centric patch, classification data such as a semantic segmentation representing any number of classes of objects or other parts of the scene, etc.). In some embodiments, the classification data may include a layer for each of one or more classes of object, such as (e.g., different types of) furniture, doors, windows, appliances, walls, lighting fixtures, electrical outlets and switches, electronic devices, personal items, other character(s), audio sources, and/or other things that may be in the scene. As such, the scene navigation component 132 may generate a representation of the scene data 215 and apply the scene data 215 to the layer(s) 220 to extract a set of features (e.g., an encoded 2D feature map) representing the scene data 215.

To inject the scene data 215 into the pre-trained base diffusion model, the scene-aware diffusion model 200 may generate sampled features $$f_t^1 \ldots f_t^N$$

by sampling the encoded feature map at elements corresponding to the positions of the (e.g., 2D) waypoints of the motion sequence $$x_t^1 \ldots x_t^N$$

at a particular diffusion step t (e.g., the features may be sampled at the locations being denoised, which may change at each diffusion step t based on the denoised motion sequence predicted at the previous step t+1).

As such, the scene-aware diffusion model 200 may use the state of the motion sequence $$x_t^1 \ldots x_t^N$$

at a particular diffusion step t and corresponding sampled features $$f_t^1 \ldots f_t^N$$

of the scene data 215 to predict a denoised motion sequence $$\hat{x}_0^1 \ldots \hat{x}_0^N.$$

For example, the scene-aware diffusion model 200 may encode a representation of the text prompt 105 of FIG. 1, a representation of which diffusion step is iterating, and/or some other input, and use the encoded representation as a conditioning input 205. Layer(s) 210 may serve to resize the input representation of the motion sequence $$x_t^1 \ldots x_t^N$$

to some designated dimensionality for the transformer encoder 230. For example, each waypoint may be represented in 3D (e.g., x, y, heading angle), and the layer(s) 210 may resize each waypoint to a larger dimensionality (e.g., 64 or 128), such as one corresponding to the dimensionality of the sampled features of the encoded feature map of the scene data 215. Positional encodings 225 may be used to encode and incorporate (e.g., add) a representation of the time step into (e.g., a corresponding token representing) each corresponding waypoint or sampled scene feature. The transformer encoders 230 and 235 may each comprise any number of layers, and each layer may include any number of attention heads that effectively weight different elements in the input based on importance.

The transformer encoder 235 may be connected to the transformer encoder 230 in any suitable manner. In an example implementation, the transformer encoder 235 may be connected to the transformer encoder 230 via one or more (e.g., linear) layers followed by an addition (e.g., a residual or skip connection). For example, the transformer encoder 235 may output an encoded representation of the scene data 215, one or more linear layers (illustrated in FIG. 2 as arrows between the transformer encoder 235 and the transformer encoder 230) may be used to process the encoded representation of the scene data 215, and the result may be added to the intermediate features of the transformer encoder 230 (e.g., a pre-trained base diffusion transformer).

In some embodiments, the base diffusion model (e.g., layer(s) 210, the transformer encoder 230, and layer(s) 240) may be pre-trained on motion data without scene data, and the scene-aware diffusion model 200 may be tuned (e.g., fine-tuned) on motion-scene data (e.g., input training data comprising noised motion sequences and scene data 215, and corresponding ground truth denoised motion sequences). For example, the scene-aware component of the scene-aware motion diffusion model 200 (e.g., layer(s) 220, the transformer encoder 235, one or more layers connecting the transformer encoder 235 to the transformer encoder 230) may be initialized (e.g., with initial values for trainable parameters such as weights set to zero), the base diffusion model may be frozen or locked (illustrated with padlocks in FIG. 2), and the scene-aware diffusion model 200 may be trained using paired motion-scene training data to learn values for the trainable parameters of the scene-aware component. Generally, any known motion-scene dataset may be used and/or any technique may be used to generate a motion-scene dataset with input and ground truth training data for to the scene-aware diffusion model 200. However, by incorporating a scene-aware component with a base pre-trained motion diffusion model, the resulting scene-aware diffusion model 200 may be fine-tuned on more limited motion-scene data, enabling generation of more accurate and scene-aware human motion on far less motion-scene data than in prior techniques.

As such, the scene navigation component 132 of FIG. 1 may use the scene-aware diffusion model 200 of FIG. 2 to generate and/or denoise a motion sequence 135 representing position(s) and/or orientation(s) of one or more joint(s) at each of a plurality of 2D or 3D waypoints along a path through the 3D scene 110. In some embodiments, the motion sequence 135 may represent position and orientation for a representative joint such as a root joint. The root joint may be a designated pivot point in a skeletal structure of the character being animated (e.g., situated at the base of the spine or pelvis). The root joint may serve as a fundamental reference point for the entire skeleton, influencing the position and orientation of the entire body. As such, manipulating the root joint in animation may effectively serve to relocate the entire character within the 3D scene 110. In some embodiments, the scene navigation component 132 may use any known motion inpainting technique to generate an animation of the full body of the character from the position and orientation of the root joint as it advances through the waypoints of the motion sequence 135. As such, the scene navigation component 132 may animate the character moving from the starting point 126 to the first target point 128 in the 3D scene 110.

Figure 3:
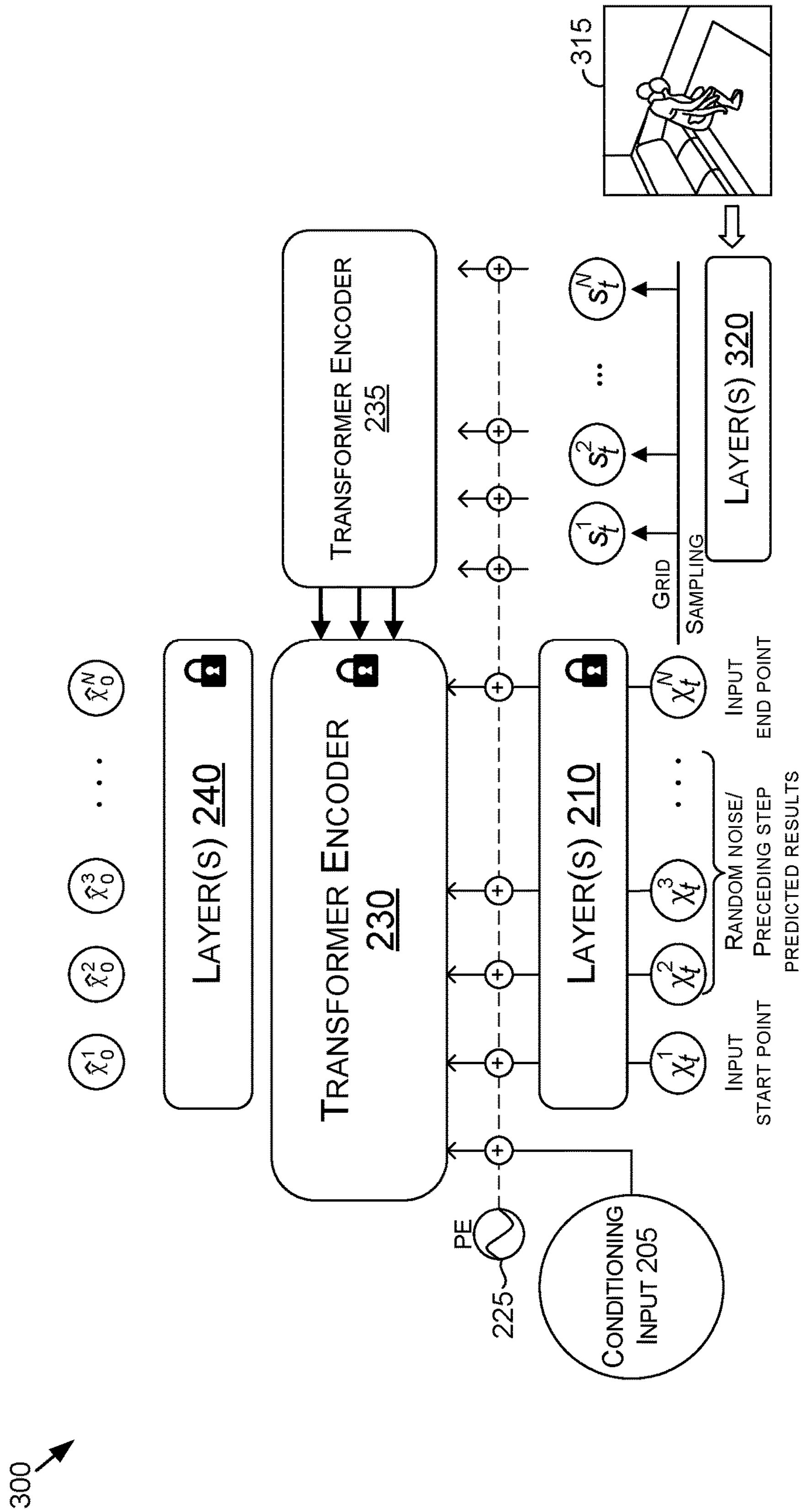
FIG. 3 is a block diagram of an example scene-aware motion diffusion model for a scene interaction component, in accordance with some embodiments of the present disclosure.

FIG. 3 is a block diagram of an example scene-aware diffusion model 300 for a scene interaction component, in accordance with some embodiments of the present disclosure. For example, the scene-aware diffusion model 300 may be used by the scene interaction component 140 of FIG. 1 to predict a motion sequence comprising joint orientations (and/or positions) of a sequence of waypoints along a path from the first target point 128 to the second target point 130 in the 3D scene 110.

Generally, the components of the scene-aware diffusion model 200 of FIG. 2 and the scene-aware diffusion model 300 of FIG. 3 that share a reference number with a corresponding component of the scene-aware motion diffusion model 200 may implement similar functionality, although their architectures may differ. By way of nonlimiting example, the scene navigation component 132 of FIG. 1 may use the scene-aware diffusion model 200 of FIG. 2 to predict a motion sequence that represents some number of features (e.g., 2D position and/or heading angle for a ground projection of the root joint of the character) for each of a plurality of waypoints that form a path through a 3D scene. By contrast, the scene interaction component 140 of FIG. 1 may use the scene-aware diffusion model 300 of FIG. 3 to predict a motion sequence that represents some other number of features (e.g., 3D position and/or 3D orientation for all joints in the character's body) for each of a plurality of waypoints that form a path interacting with an object in the 3D scene (e.g., representing an animation of the character sitting down on a chair). As such, the instances of the layer(s) 210 in the scene-aware diffusion models 200 and 300 may be sized differently and may accept input data with different dimensionalities. Additionally or alternatively, the number of waypoints represented in the motion sequence accepted and/or generated by the scene-aware diffusion models 200 and 300 may differ, the number of layers in one or more components of the scene-aware diffusion models 200 and 300 may differ, different conditioning input 205 may be injected into the scene-aware diffusion models 200 and 300, and/or or some other aspect of the architectures may differ.

In the embodiment illustrated in FIG. 3, the scene-aware diffusion model 300 includes a scene-aware component comprising layer(s) 320 and the transformer encoder 235, which may be integrated with or connected to the pre-trained base diffusion model (e.g., the layer(s) 210, the transformer encoder 230, and/or the layer(s) 240), forming an input channel for a representation of the target object and/or an interaction with the target object (e.g., object interaction data 315).

For example, the scene interaction component 140 of FIG. 1 may generate the object interaction data 315, which may encode a representation of a 3D structure of a target object, surface, or other portion of a 3D scene or an object in a 3D scene (e.g., a 3D point cloud, a signed distance field representing the distance and direction from any point to the 3D object), and/or a representation of an interaction (e.g., a basis point set (BPS) representation of contact and/or proximity) between a character and the target object, surface, or other portion of the 3D scene. For example, the scene interaction component 140 may encode the interaction at any given point in time using one or more BPS representations. Generally, a BPS representation may be used to encode the geometry and appearance of a 3D object (e.g., a 3D point cloud, 3D mesh, or other 3D model) in terms of minimum distances between a set of (e.g., randomly selected) basis points and corresponding closest points on the 3D object.

By way of nonlimiting example, the scene interaction component 140 may define a set of 3D basis points (e.g., randomly selected, aligned with voxels of a 3D grid) which may be used as a frame of reference. To encode a target object (e.g., a 3D model of a chair) and/or a corresponding portion (e.g., a 3D crop or sample) of the 3D scene (e.g., surrounding the character and/or target object), the scene interaction component 140 may identify and select the closest vertex of the target object for each basis point, determine the distance between each basis point and the corresponding closest vertex, and generate a (e.g., concatenated) representation of those distances. To encode a representation of the interaction (e.g., contact and/or proximity) between the character and the target object, the scene interaction component 140 may use the selected vertices of the target object as a set of 3D basis points, and for each such point, identify and select the closest vertex of a 3D representation of the character, determine the distance between each such point and the corresponding closest vertex, and generate a (e.g., concatenated) representation of those distances. As such, the scene interaction component 140 may generate and use a representation of one or more of the foregoing as the object interaction data 315, which may associate an encoded representation of proximity and/or contact with each of a plurality of 3D points, and the scene interaction component 140 may apply the object interaction data 315 to the layer(s) 320 (e.g., which may form a 3D convolutional neural network) to encode the object interaction data 315 into a 3D grid and extract a set of 3D features (e.g., an encoded 3D feature map) representing the object interaction data 315. This is meant simply as an example, and any known way of encoding a representation of a 3D structure of a target object, surface, or other portion of a 3D scene or an object in a 3D scene, and/or a representation of an interaction between a character and the target object, surface, or other portion of the 3D scene, may be implemented within the scope of the present disclosure.

Continuing with the example above, to inject the object interaction data 315 into the pre-trained base diffusion model, the scene-aware diffusion model 300 may generate sampled features $$s_t^1 \ldots s_t^N$$

by sampling the encoded 3D feature map at elements corresponding to the 3D positions of the joint locations at the waypoints of the motion sequence $$x_t^1 \ldots x_t^N$$

at a particular diffusion step t (e.g., the features may be sampled at the 3D joint locations being denoised, which may change at each diffusion step t based on the denoised motion sequence predicted at the previous step t+1). As such, the scene-aware diffusion model 300 may use the state of the motion sequence $$x_t^1 \ldots x_t^N$$

at a particular diffusion step t and corresponding sampled features $$s_t^1 \ldots s_t^N$$

of the object interaction data 315 to predict a denoised motion sequence $$\hat{x}_0^1 \ldots \hat{x}_0^N.$$

In some embodiments, the base diffusion model (e.g., layer(s) 210, the transformer encoder 230, and layer(s) 240) of FIG. 3 may be pre-trained on motion data without scene data, and the scene-aware diffusion model 300 may be tuned (e.g., fine-tuned) on motion-scene data (e.g., input training data comprising noised motion sequences and object interaction data 315, and corresponding ground truth denoised motion sequences). For example, the scene-aware component of the scene-aware diffusion model 300 (e.g., layer(s) 320, the transformer encoder 235, one or more layers connecting the transformer encoder 235 to the transformer encoder 230) may be initialized (e.g., with initial values for trainable parameters such as weights set to zero), the base diffusion model may be frozen or locked (illustrated with padlocks in FIG. 3), and the scene-aware diffusion model 300 may be trained using paired motion-scene training data to learn values for the trainable parameters of the scene-aware component. Generally, any known motion-scene dataset may be used and/or any technique may be used to generate a motion-scene dataset with input and ground truth training data corresponding to the scene-aware diffusion model 300. However, by incorporating a scene-aware component with a base pre-trained motion diffusion model, the resulting scene-aware diffusion model 300 may be fine-tuned on more limited motion-scene data, enabling generation of more accurate and scene-aware human motion on far less motion-scene data than in prior techniques.

In some embodiments, training data that pairs (e.g., captured) motion data with a corresponding 3D object being interacted with may be generated using data augmentation to retarget motion originally captured with respect to one object onto another object (e.g., retargeting captured motion data sitting down onto a particular chair onto a different chair). In contrast to prior techniques that retarget contact locations (e.g., the locations where the arms or pelvis contact the chair) to target locations where corresponding joints of a skeletal structure make contact with the target object, in some embodiments, the surface structure of the body of the character may be modeled using a 3D model (e.g., a 3D mesh), so contact locations may be retargeted to target locations where corresponding locations on the body surface make contact with the target object. As such, the resulting retargeted motion-object interaction data is more accurate than prior techniques. As a result, the scene-aware diffusion model 300 may be fine-tuned using this training data, which should increase the accuracy of the resulting generated motion.

As such, and returning to FIG. 1, the scene interaction component 140 of FIG. 1 may use the scene-aware diffusion model 300 of FIG. 3 to generate and/or denoise a motion sequence 145 representing position(s) and/or orientation(s) of one or more joint(s) at each of a plurality of 2D or 3D waypoints along a path interacting with the target object (e.g., the chair 124) in 3D scene 110. In some embodiments, the motion sequence 145 may represent positions and orientations for a plurality of joints in a skeletal structure of the character being animated for each of the waypoints. As such, in this example, the scene interaction component 140 may use these positions and orientations to generate an animation of the body of the character as it advances through the waypoints of the motion sequence 145, without the need for motion inpainting. As such, the scene interaction component 140 may animate the character moving from the first target point 128 to the second target point 130 in the 3D scene 110.

Figure 4:
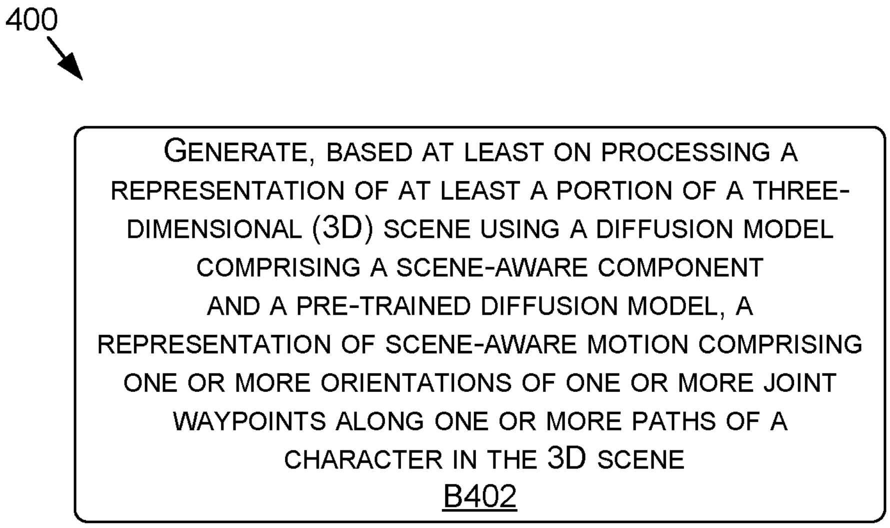
FIG. 4 is a flow diagram illustrating a method of generating a representation of scene-aware motion, in accordance with some embodiments of the present disclosure.
Figure 5:
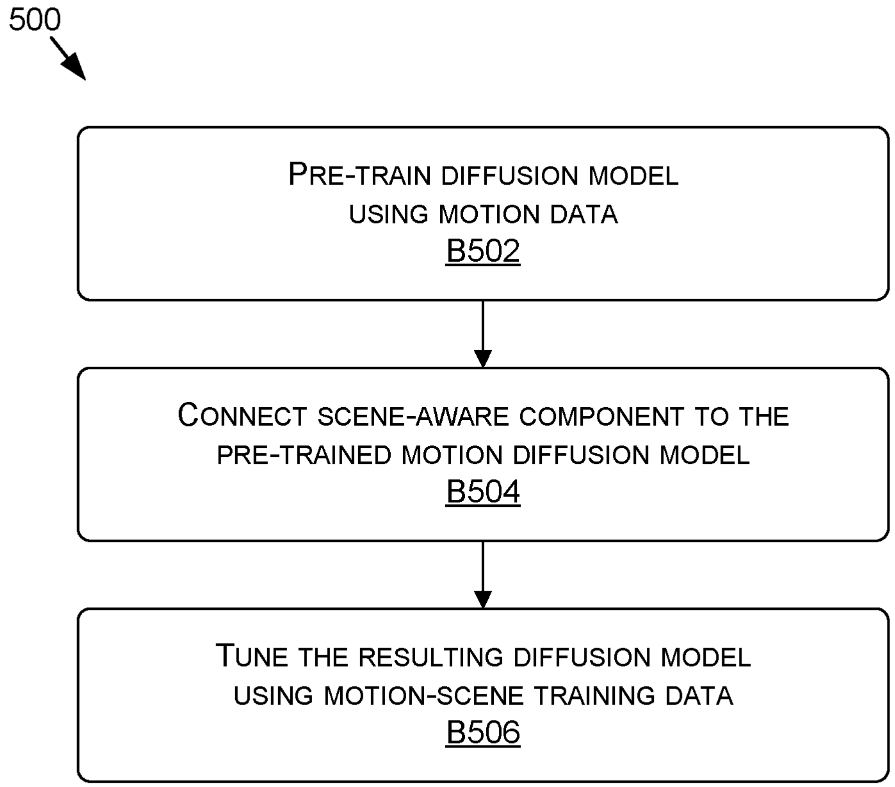
FIG. 5 is a flow diagram illustrating a method of generating a motion diffusion model, in accordance with some embodiments of the present disclosure.

Now referring to FIGS. 4 and 5, each block of methods 400 and 500, described herein, comprises a computing process that may be performed using any combination of hardware, firmware, and/or software. For instance, various functions may be carried out by a processor executing instructions stored in memory. The methods 400 and 500 may also be embodied as computer-usable instructions stored on computer storage media. The methods 400 and 500 may be provided by a standalone application, a service or hosted service (standalone or in combination with another hosted service), or a plug-in to another product, to name a few. In addition, the methods 400 and 500 are described, by way of example, with respect to the motion generation pipeline 100 of FIG. 1. However, these methods may additionally or alternatively be executed by any one system, or any combination of systems, including, but not limited to, those described herein.

FIG. 4 is a flow diagram illustrating a method 400 of generating a representation of scene-aware motion, in accordance with some embodiments of the present disclosure. The method 400, at block B402, includes generating, based at least on processing a representation of at least a portion of a three-dimensional (3D) scene using a diffusion model comprising a scene-aware component and a pre-trained motion diffusion model, a representation of scene-aware motion comprising one or more orientations of one or more joint waypoints along one or more paths of a character in the 3D scene.

For example, with respect to the motion generation pipeline 100 of FIG. 1, the scene navigation component 132 may use the scene-aware diffusion model 200 of FIG. 2 to predict a motion sequence representing positions and/or orientations of one or more joints at each of one or more waypoints along the path 127 from the starting point 126 to the first target point 128. More specifically, the scene-aware diffusion model 200 of FIG. 2 may comprise a scene-aware component (e.g., layer(s) 220, the transformer encoder 235, one or more layers connecting the transformer encoder 235 to the transformer encoder 230) and a pre-trained diffusion model (e.g., layer(s) 210, the transformer encoder 230, and layer(s) 240), and the scene-aware component may form an input channel for the scene data 215, which may represent a 2D or 3D structure of at least a portion of the 3D scene 110 at a particular time (e.g., a 2D or 3D occupancy grid, a floor map, a height map, a patch of one of the foregoing such as an ego-centric patch, classification data such as a semantic segmentation representing any number of classes of objects or other parts of the scene, etc.). As such, the scene-aware diffusion model 200 may use the state of the motion sequence $$x_t^1 \ldots x_t^N$$

at a particular diffusion step t and corresponding sampled features $$f_t^1 \ldots f_t^N$$

of the scene data 215 to predict a denoised motion sequence $$\hat{x}_0^1 \ldots \hat{x}_0^N.$$

In another example, the scene interaction component 140 may use the scene-aware diffusion model 300 of FIG. 3 to predict a motion sequence representing positions and/or orientations of one or more joints at each of one or more waypoints along the path 129 from the first target point 128 to the second target point 130. More specifically, the scene-aware diffusion model 300 of FIG. 3 may comprise a scene-aware component (e.g., layer(s) 320, the transformer encoder 235, one or more layers connecting the transformer encoder 235 to the transformer encoder 230) and a pre-trained diffusion model (e.g., layer(s) 210, the transformer encoder 230, and layer(s) 240), and the scene-aware component may form an input channel for the object interaction data 315, which may encode a representation of a 3D structure of a target object, surface, or other portion of a 3D scene or an object in a 3D scene, and/or a representation of an interaction (e.g., a BPS representation of contact and/or proximity) between a character and the target object, surface, or other portion of the 3D scene. As such, the scene-aware diffusion model 300 may use the state of the motion sequence $$x_t^1 \ldots x_t^N$$

at a particular diffusion step t and corresponding sampled features $$s_t^1 \ldots s_t^N$$

of the object interaction data 315 to predict a denoised motion sequence $$\hat{x}_0^1 \ldots \hat{x}_0^N.$$

FIG. 5 is a flow diagram illustrating a method 500 of generating a diffusion model for motion, in accordance with some embodiments of the present disclosure. The method 500, at block B502, includes pre-training a diffusion model using motion data. For example, with respect to FIG. 2, the scene-aware diffusion model 200 may include a base diffusion model (e.g., layer(s) 210, the transformer encoder 230, and layer(s) 240), which may be pre-trained (e.g., by the computing device 600 of FIG. 6) on motion data without scene data using any known technique.

The method 500, at block B504, includes connecting a scene-aware component to the pre-trained diffusion model. For example, with respect to FIG. 2, a scene-aware component comprising layer(s) 220 and a transformer encoder 235 may be integrated with or connected to the pre-trained base diffusion model (e.g., using the computing device 600 of FIG. 6), forming an input channel for scene data 215. In some embodiments, the transformer encoder 235 may be connected to the transformer encoder 230 via one or more (e.g., linear) layers followed by an addition (e.g., a residual or skip connection). The layer(s) 220, the transformer encoder 235, and/or the one or more layers connecting the transformer encoder 235 to the transformer encoder 230 may be initialized (e.g., with initial values for trainable parameters such as weights set to zero).

The method 500, at block B506, includes tuning the resulting diffusion model using motion-scene training data. For example, with respect to FIG. 2, the scene-aware diffusion model 200, the base diffusion model may be frozen or locked (e.g., by the computing device 600 of FIG. 6), and the scene-aware diffusion model 200 may be trained (e.g., by the computing device 600 of FIG. 6) using paired motion-scene training data to learn values for the trainable parameters of the scene-aware component. Generally, any known motion-scene dataset may be used and/or any technique may be used to generate a motion-scene dataset with input and ground truth training data corresponding to the scene-aware diffusion model 200. However, by incorporating a scene-aware component with a base pre-trained diffusion model, the resulting scene-aware diffusion model 200 may be fine-tuned on more limited motion-scene data, enabling generation of more accurate and scene-aware human motion on far less motion-scene data than in prior techniques.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), systems for performing light transport simulation, systems for performing collaborative content creation for 3D assets, systems implemented at least partially using cloud computing resources, and/or other types of systems.

Example Computing Device

Figure 6:
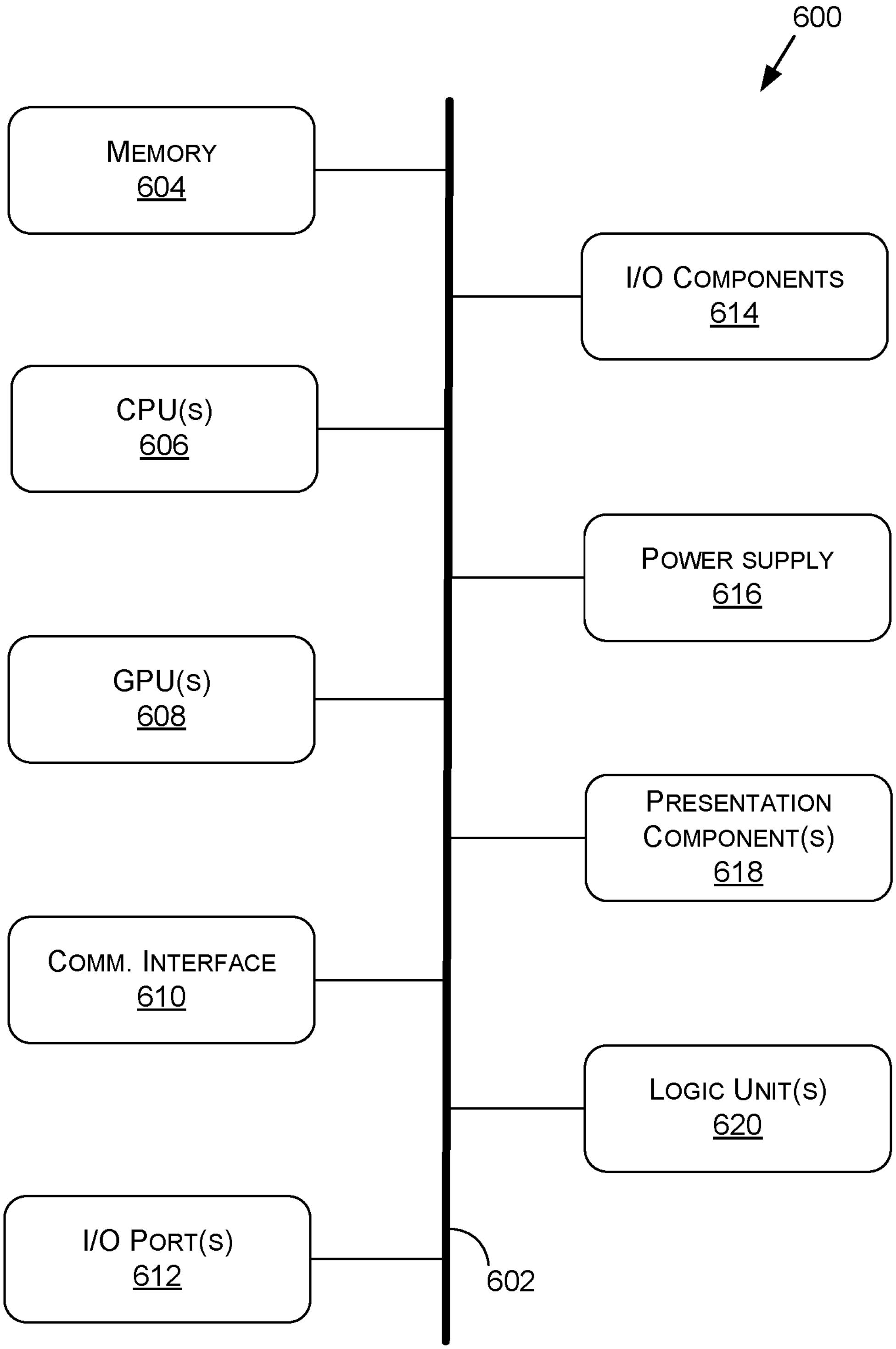
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
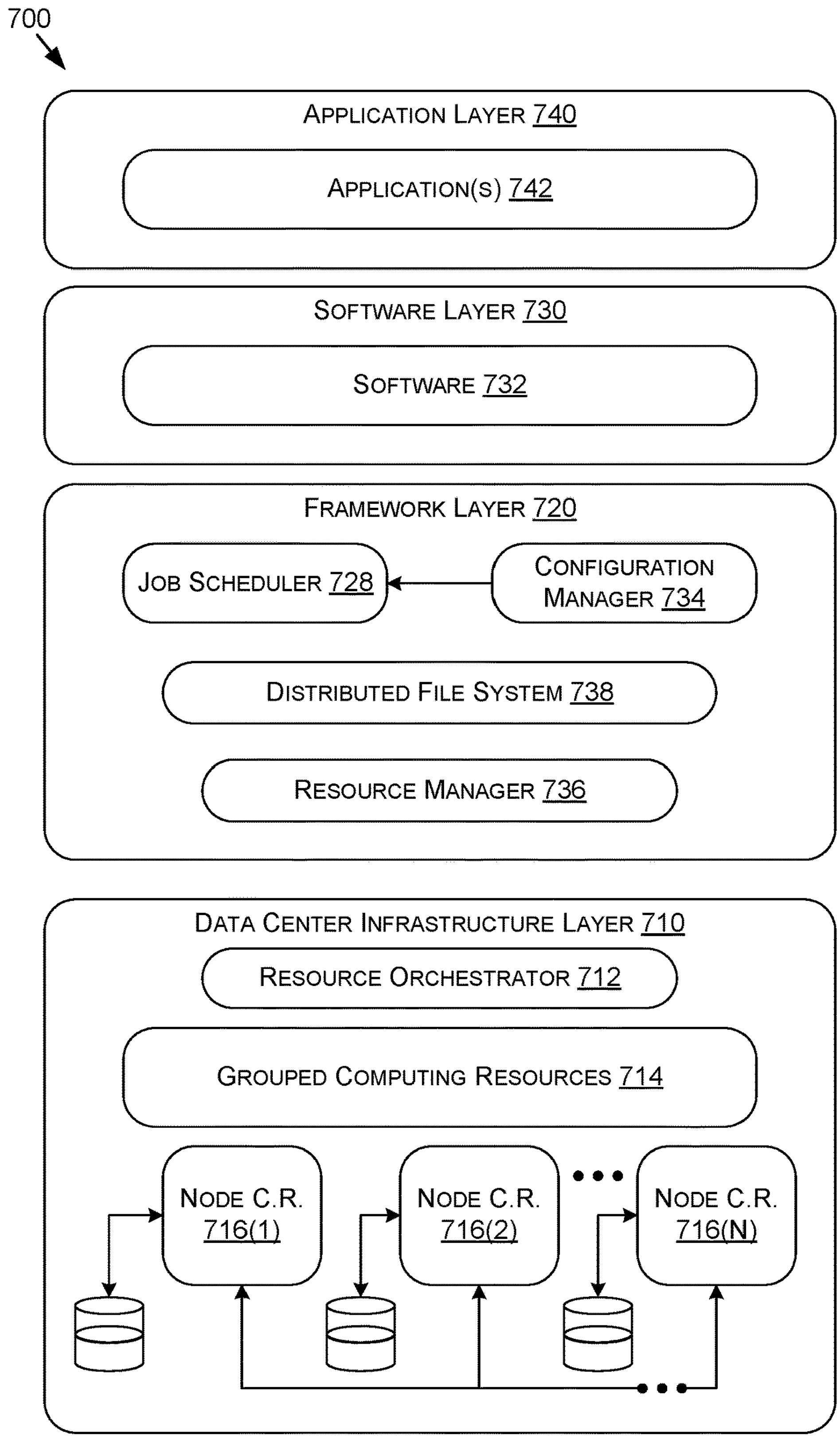
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 728, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 728 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 728. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:

one or more processing units to provide a representation of at least a navigable portion of a three-dimensional (3D) scene to a pre-trained motion diffusion model to generate a representation of scene-aware motion comprising one or more orientations of one or more joint waypoints along one or more paths of a character at least partially depicted in the 3D scene.

2. The processor of claim 1, wherein the one or more processing units are further to generate a diffusion model based at least on adding, to the pre-trained motion diffusion model, a scene-aware component that injects the representation of at least the navigable portion of the 3D scene, and tuning the diffusion model using motion-scene training data with the pre-trained motion diffusion model frozen.

3. The processor of claim 1, wherein to generate the representation of scene-aware motion, the one or more processing units inject a top-down height map corresponding to the representation of at least the navigable portion of the 3D scene into the pre-trained motion diffusion model.

4. The processor of claim 1, wherein to generate the representation of scene-aware motion, the one or more processing units provide a 3D point cloud representing at least a portion of a 3D object, distinct from the character, in the 3D scene into the pre-trained motion diffusion model.

5. The processor of claim 1, wherein to generate the representation of scene-aware motion, the one or more processing units provide classification data corresponding to the representation of at least the navigable portion of the 3D scene and representing one or more classified locations of one or more classified objects in the 3D scene into the pre-trained motion diffusion model.

6. The processor of claim 1, wherein to generate the representation of scene-aware motion, the one or more processing units provide classification data representing one or more classified locations of one or more other characters or one or more audio sources in the 3D scene into the pre-trained motion diffusion model.

7. The processor of claim 1, wherein the one or more processing units are further to update one or more parameters of a diffusion model comprising the pre-trained motion diffusion model and a scene aware component using training data generated based at least on retargeting motion data comprising one or more contact locations with a first object to one or more corresponding locations where a modeled body surface makes contact with a target object.

8. The processor of claim 1, wherein the processor is comprised in at least one of:

- a system for performing simulation operations;
- a system for performing digital twin operations;
- a system for performing light transport simulation;
- a system for performing collaborative content creation for 3D assets;
- a system for performing deep learning operations;
- a system for performing remote operations;
- a system for performing real-time streaming;
- a system for generating or presenting one or more of augmented reality content, virtual reality content, or mixed reality content;
- a system implemented using an edge device;
- a system implemented using a robot;
- a system for generating synthetic data;
- a system for generating synthetic data using AI;
- a system incorporating one or more virtual machines (VMs);
- a system implemented at least partially in a data center; or
- a system implemented at least partially using cloud computing resources.

9. A system comprising one or more processing units to generate, using a pre-trained motion diffusion model and based on a representation of at least a navigable portion of a three-dimensional (3D) scene, a representation of scene-aware motion corresponding to a character at least partially depicted in the 3D scene.

10. The system of claim 9, wherein the one or more processing units are further to generate a diffusion model based at least on adding, to the pre-trained motion diffusion model, a scene-aware component that injects the representation of at least the navigable portion of the 3D scene, and tuning the diffusion model using motion-scene training data with the pre-trained motion diffusion model frozen.

11. The system of claim 9, wherein to generate the representation of scene-aware motion, the one or more processing units provide a top-down height map corresponding to the representation of at least the navigable portion of the 3D scene into the pre-trained motion diffusion model.

12. The system of claim 9, wherein to generate the representation of scene-aware motion, the using the diffusion model comprises injecting a 3D point cloud representing at least a portion of a 3D object, distinct from the character, in the 3D scene into the pre-trained motion diffusion model of the diffusion model.

13. The system of claim 9, wherein the one or more processing units are further to provide classification data representing one or more classified locations of one or more classified objects in the 3D scene into the pre-trained motion diffusion model.

14. The system of claim 9, wherein to generate the representation of scene-aware motion, the one or more processing units provide classification data representing one or more classified locations of one or more other characters or one or more audio sources in the 3D scene into the pre-trained motion diffusion model.

15. The system of claim 9, wherein the one or more processing units are further to update one or more parameters of a diffusion model comprising the pre-trained motion diffusion model and a scene-aware component using training data generated based at least on retargeting motion data comprising one or more contact locations with a first object to one or more corresponding locations where a surface of a modeled body makes contact with a target object.

16. The system of claim 9, wherein the system is comprised in at least one of:

a system for performing simulation operations;
a system for performing digital twin operations;
a system for performing light transport simulation;
a system for performing collaborative content creation for 3D assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for generating synthetic data;
a system for generating synthetic data using AI;
a system incorporating one or more virtual machines (VMs);
a system implemented at least partially in a data center; or
a system implemented at least partially using cloud computing resources.

17. A method comprising:

providing a representation of at least a navigable portion of a three-dimensional (3D) scene into a pre-trained diffusion model; and generating, based on the representation of at least the navigable portion of the 3D scene, a representation of one or more orientations of one or more waypoints along one or more paths of a character in the 3D scene.

18. The method of claim 17, further comprising generating a diffusion model based at least on adding, to the pre-trained diffusion model, a scene-aware component that performs the providing, and tuning the diffusion model using motion-scene training data with the pre-trained diffusion model frozen.

19. The method of claim 17, further comprising updating one or more parameters of a diffusion model comprising the pre-trained diffusion model using training data generated based at least on retargeting motion data comprising one or more contact locations with a first object to one or more corresponding locations where a modeled body surface makes contact with a target object.

20. The method of claim 17, wherein the method is performed by at least one of:

a system for performing simulation operations;
a system for performing digital twin operations;
a system for performing light transport simulation;
a system for performing collaborative content creation for 3D assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for generating synthetic data;
a system for generating synthetic data using AI;
a system incorporating one or more virtual machines (VMs);
a system implemented at least partially in a data center; or
a system implemented at least partially using cloud computing resources.

* * * * *